US005397416A

United States Patent [19]

Howarth et al.

[11] Patent Number: 5,397,416

[45] Date of Patent: Mar. 14, 1995

[54] METHOD OF MAKING A MAT TO FRAME A PICTURE

[75] Inventors: Alan C. Howarth, 3 Wethersfield Dr., Medford, N.J.; Lanette Badel, Chadsford, Pa.

[73] Assignee: Alan C. Howarth, Medford, N.J.

[21] Appl. No.: 120,062

[22] Filed: Sep. 13, 1993

[51] Int. Cl.[6] .......... B32B 31/00

[52] U.S. Cl. .......... 156/264; 156/265; 156/266; 156/304.3; 156/304.5; 156/258; 156/297

[58] Field of Search .......... 156/264, 265, 266, 304.1, 156/304.3, 304.5, 258, 297; 40/152, 152.1, 158.1, 159, 159.1, 159.2, 160; 428/14

[56] References Cited

U.S. PATENT DOCUMENTS

| | | | |
|---|---|---|---|
| 1,506,215 | 8/1924 | Beshgetoor . | |
| 2,373,074 | 4/1945 | Ziemmerman | 40/154 |
| 2,516,417 | 7/1950 | Rado | 40/152 |
| 2,796,690 | 6/1957 | Engelhardt | 40/158 |
| 3,289,343 | 12/1966 | Jensen et al. | 40/158.1 X |
| 3,382,595 | 5/1968 | Shore | 40/158 |
| 3,713,238 | 1/1973 | Hyman et al. | 40/158 |
| 4,192,905 | 3/1980 | Scheibal | 428/80 |
| 4,301,199 | 11/1981 | Pfanstiehl | 428/14 |
| 4,393,612 | 7/1983 | Clark | 40/152 |

*Primary Examiner*—David A. Simmons
*Assistant Examiner*—Curtis Mayes
*Attorney, Agent, or Firm*—Thomas A. Lennox

[57] ABSTRACT

Depth matting in the form of rigid thermoplastic foam bevel board is cut with a device to form a forty-five degree angled surface on one end facing away from a front surface of the bevel board which has a lengthwise edge forty-five degree angle bevel face used to provide depth between standard mats and the framed picture. A cutting device is provided holding the bevel board on its edge against a vertical wall with a vertical slot through which a knife edge is forced downwardly through the slot and the bevel board. The beveled surface on the end of the cut bevel board panel is abutted against the lengthwise edge beveled surface of the adjoining bevel board panel at each corner of the standard mat and attached to the rear surface of that mat.

15 Claims, 4 Drawing Sheets

METHOD OF MAKING A MAT TO FRAME A PICTURE

BACKGROUND OF THE INVENTION

This invention involves the utilization of depth matting, generally known as bevel board and a device for cutting of that bevel board to use in the method.

Depth matting, in the form of bevel board paneling has been recently introduced for use in the picture framing industry. Typical standard framing techniques utilize an integral rectangular mat framing the picture cut from a single piece of paper board. The matting comes in a variety of colors, textures, and even prints. It is desirable to introduce a depth of field between the rear surface of the rectangular mat and the picture that is behind it and is framed by the mat. Various techniques have been utilized to provide a distance between these surfaces and the bevel board has been introduced to meet that need. Bevel board is supplied in the United States by Garrett Molding Company, Inc. at 200 Carl Street, Santa Cruz, Calif. and is supplied in about two and a half meter lengths and in a width of about seven centimeters. The thickness of the depth mat is supplied in six and ten millimeters. The composition of the bevel board paneling is a rigid thermoplastic foam polymer bare or covered with neutral pH paper, that being paper less likely to cause deterioration of the framed artwork. A key element of the bevel board is a forty-five degree angled beveled surface along one lengthwise edge. This beveled face is intended to be positioned so that the upper edge of the beveled face is aligned with the inside edge of the standard integral mat. The exposed beveled surface extends inwardly to a bottom edge proximate the artwork surface. Only the beveled surface is exposed.

The present technique for utilizing this bevel board is to make miter cuts through the boards at forty-five degree angles across the front surface of the panel angled away from the beveled surface so that a frame can be produced to be sandwiched between the mat and the picture. The miter cut is hidden under the mat except at the corners. Only the beveled edge surface is displayed providing a depth effect. Unfortunately, the miter cuts must be very accurate so as to exactly position the beveled surfaces just inside the mat opening. If mismeasured mitered cuts form too large a depth mat frame, the beveled surfaces of the bevel board will be partially hidden and will not extend inwardly from the inside edge of the integral mat opening. On the other hand, if the mismeasured mitered cuts make the depth matting too small, then part of the front surface of the bevel board depth matting will be exposed along with the mitered cuts across boards in the corners. An undesirable appearance showing the front surface of the depth matting results. Although equipment is available to make accurate mitered cuts, the necessity of exactly matching the opening in the mat usually requires a number of attempts involving lost time and materials. The necessity of making these miter cuts and the difficult construction makes the use of the bevel board very expensive.

A number of other methods of obtaining and using depth boards and angled matting have been available in the prior art, but none solve the needs described above nor attain the objects described hereinbelow.

SUMMARY OF THE INVENTION

It is an object of the present invention to utilize the bevel board, now commercially available, in a method cutting the length of the board and cutting it in a fashion such that the length of the cut is not critical and may be easily utilized to form a perfect match of the beveled surface of the depth board frame with the inside edge of the integral mat opening.

It is a further object of the present invention to provide a device to cut the bevel board with a beveled faced end that can be utilized in the method to apply the bevel board in the method of framing the picture.

It has also been found desirable to produce a bevel board mat that can be covered with a fabric, decorative paper or other materials. Again, the prior art miter type cutting techniques make it difficult to obtain an accurate inside dimension and it is difficult to cut paper board in heavy gauges. It is an object of the present invention to provide a method by which a framing mat can be produced from the bevel board to be covered with a sheet material and used in place of the standard mats. With this new method the objects of accurate dimensions and ease of cutting can be attained. When a mat produced by this new method is being covered, the length of the bevel board panel extending past the outside peripheral edge of the mat can be easily cut off prior to covering.

Using the prior miter cutting techniques, it has been virtually impossible to provide a kit to supply depth matting for a particular size integral standard mat. Even though the bevel board panels are mostly hidden behind the integral mat, the size of the depth mat is critical using the miter cut technique. Since minute variations in the mat size are difficult to avoid, no kits have been made available. It is an object of the present invention to provide a method of producing a kit which can be easily used to provide a depth mat behind a standard integral mat.

It is an object of the present invention to provide a method wherein the individual bevel board panels may be serially attached to the rear surface of the standard integral mat or in the alternative attached to the adjoining bevel board panel or any combination thereof. It is preferred to attach the specially cut bevel board panels in order to the rear surface of the standard integral mat.

It is a particular and important object of the present invention to provide a method and a device for cutting the bevel board by persons who are putting the frame together as opposed to the companies supplying the pre-cut mitered frame members. While these later companies are presently equipped to make the miter cuts the typical framing company is not equipped. This new method, essentially eliminating the necessity of close tolerance cutting, will avoid the framing company from having to make very accurate measurements and then order the depth mat panels from a supplier of the precut lengths.

It is an object of an aspect of this invention to provide a device that will cut a forty-five degree angle face transverse to the length of the bevel board on an and of a panel of the bevel board. It is a further object of a preferred aspect of the invention to provide a cutting device that does not require mechanical holding of the bevel board panel.

An aspect of the invention is a method of making a mat to frame a picture having a front surface, a rear surface, and a peripheral outer edge. The method includes providing a depth matting elongate panel, generally known in the trade as bevel board. Each panel includes a thickness, a front surface having a lengthwise edges and a width, and a lengthwise beveled edge surface angled from a first lengthwise edge of the front surface at a forty-five degree angle downwardly and generally facing the front surface. The method further includes cutting a beveled face on an end of the depth matting elongate panel normal to the length of the panel member and at a forty-five degree angle from and facing away from the front surface, and cutting four elongate panel members from the elongate panel. The cutting results in each panel member including a length of the front surface terminating at first and second ends, and a beveled face on each first end of each panel member normal to the length of the panel member and at a forty-five degree angle facing away from the front surface. The method further includes aligning all four panel members flat on a surface with the front surfaces facing a same direction. The method then includes abutting the beveled face of the first end of a first panel member against the lengthwise beveled edge of a second panel member proximate the second end of the second panel member and adhering the first panel member to the second panel member. The method then includes abutting the beveled face of the first end of the second panel member against the lengthwise beveled edge of a third panel member proximate the second end of the third panel member and adhering the second panel member to the third panel member. The method further includes abutting the beveled face of the first end of the third panel member against the lengthwise beveled edge of a fourth panel member proximate the second end of the fourth panel member and adhering the third panel member to the fourth panel member. The method further includes abutting the beveled face of the first end of the fourth panel member against the lengthwise beveled edge of the first panel member proximate the second end of the first panel member and adhering the fourth panel member to the first panel member.

It is preferred that the method further include providing a rectangular integral mat frame member having a front surface, a rear surface, a peripheral outer edge with a width and a length, a rectangular opening having four inner peripheral edges, and a width across the frame member from inner edge to outer edge. The width of the panel members is less than the width across the integral mat frame member from inner edge to outer edge. The preferred method further includes attaching the front surfaces of the attached panel members to the rear surface of the integral mat frame member exposing fully and only the lengthwise beveled edges the panel members when the front surface of the integral mat frame member is viewed. It is further preferred that the method further include providing the depth matting elongate panel as a rigid polymeric plastic foam panel. It is also preferred that the cutting of the elongate panel yield the lengths of the four elongate panel members being sufficient to extend past a second lengthwise edge of an adjacent panel member, and the method further includes cutting off any length of the elongate panel member that extends past that second lengthwise edge.

Another aspect of the invention is a method of making a kit to make a mat to frame a picture having a front surface, a rear surface, and a peripheral outer edge. The method includes providing a depth matting elongate panel. Each panel includes a thickness, a front surface having lengthwise edges and a width, and a lengthwise beveled edge surface angled from a first lengthwise edge of the front surface at a forty-five degree angle downwardly and facing in the same general direction as the front surface, wherein the lengthwise beveled edge surface has a length greater than the peripheral outer edge of the picture. The method further includes cutting a beveled face on an end of the depth matting elongate panel normal to the length of the panel member and at a forty-five degree angle from and facing away from the front surface, and cutting four elongate panel members from the elongate panel, the cutting resulting in each panel member including a length of the front surface terminating at first and second ends, and a beveled face on each first end of each panel member normal to the length of the panel member and at a forty-five degree angle from and facing away from the front surface.

It is preferred that this method further include providing the depth matting elongate panel as a rigid polymeric plastic foam panel. It is further preferred that this method further include providing a rectangular integral mat frame member having a front surface, a rear surface, a peripheral outer edge with a width and a length, a rectangular opening having four inner peripheral edges, and a width across the frame member from inner peripheral edge to outer peripheral edge. The width of the panel members is less than the width across the frame member from inner edge to outer edge, and the length of the front surface of two of the elongate panel members is greater than the width of the opening and less than the sum of the width of the opening and the width across the frame member from inner peripheral edge to outer peripheral edge, and the length of the front surface of the remaining two of the elongate panel members is greater than the length of the opening and less than the sum of the length of the opening and the width across the frame member from inner peripheral edge to outer peripheral edge.

Yet another aspect of the invention is a method of framing a picture surrounded by a rectangular integral mat frame member having a front surface, a rear surface, a peripheral outer edge with a width and a length, a rectangular opening having four inner peripheral edges with a width and a length, and a width across the frame member from inner peripheral edge to outer peripheral edge. The method of installing depth matting sandwiched between the picture and the rear surface of the mat frame member includes providing an elongate depth matting panel. Each panel includes a thickness sufficient to provide a chosen depth between the picture and the mat frame member, a front surface having lengthwise edges and a width less than the width across the mat frame member, and a lengthwise beveled edge surface angled from a first lengthwise edge of the front surface at a forty-five degree angle downwardly and away from the front surface. The method further includes cutting a beveled face on an end of the depth matting elongate panel normal to the length of the panel member and at a forty-five degree angle from and facing away from the front surface, and cutting four elongate panel members from the elongate panel. The cutting results in each panel member including a length of the front surface terminating at first and second ends, and a beveled face on each first end of each panel member normal to the length of the panel member and at a forty-five degree angle from and facing away from the front surface. The length of the front surface of two of the elongate panel members is greater than the width of the opening and less than the sum of the width of the opening and the width across the frame member from inner peripheral edge to outer peripheral edge, and the length of the front surface of the remaining two of the elongate panel members is greater than the length of the opening and less than the sum of the length of the opening and the width across the frame member from inner peripheral edge to outer peripheral edge. The method further includes abutting and adhering the front surface of a first elongate panel member against the rear surface of the mat frame member while aligning the first lengthwise edge of said elongate panel member along a first inner peripheral edge of the opening of the mat frame member with the first end of said elongate panel member positioned at a first corner of said opening and the second end positioned past a second corner of said opening abutting a section of said rear surface. The method then further includes butting and adhering the front surface of a second elongate panel member against the rear surface of the mat frame member while aligning the first lengthwise edge of said elongate panel member along a second inner peripheral edge of the opening of the mat frame member extending from the second corner to a third corner of said opening, with the first end of said elongate panel member positioned at the second corner of said opening, the beveled face on said first end abutting the lengthwise beveled edge of the first elongate panel member, and the second end of the second elongate panel member positioned past the third corner of said opening abutting a section of said rear surface. The method then further includes abutting and adhering the front surface of a third elongate panel member against the rear surface of the mat frame member while aligning the first lengthwise edge of said elongate panel member along a third inner peripheral edge of the opening of the mat frame member extending from the third corner to a fourth corner of said opening, with the first end of said elongate panel member positioned at the third corner of said opening, the beveled face on said first end abutting the lengthwise beveled edge of the second elongate panel member, and the second end of the third elongate panel member positioned past the fourth corner of said opening abutting a section of said rear surface. The method then further includes abutting and adhering the front surface of a fourth elongate panel member against the rear surface of the mat frame member while aligning the first lengthwise edge of said elongate panel member along a fourth inner peripheral edge of the opening of the mat frame member extending from the fourth corner to the first corner of said opening, with the first end of said elongate panel member positioned at the fourth corner of said opening, the beveled face on said first end abutting the lengthwise beveled edge of the third elongate panel member, and the second end of the fourth elongate panel member positioned past the first corner of said opening abutting a section of said rear surface, wherein the beveled face on the first end of the first elongate panel member abuts the lengthwise beveled edge of the fourth elongate panel member.

It is preferred that this method further include adhering each elongate panel member to an adjacent elongate panel member. It is preferred that in this method the adhering of each elongate panel member to an adjacent elongate panel member be done with adhesive tape as each elongate panel member is in turn adhered to the mat frame member. A further aspect of the invention is a method of making a mat to frame a picture having a front surface, a rear surface, and a peripheral outer edge. The method includes providing four elongate panel members, each panel member including a thickness, a front surface having a lengthwise edges and a width, a lengthwise beveled edge surface angled from a first lengthwise edge of the front surface at a forty-five degree angle downwardly from and facing the front surface, a length of the front surface terminating at first and second ends, and a beveled face on each first end of each panel member normal to the length of the panel member and at a forty-five degree angle from and facing away from the front surface. The method the follows the steps of the methods described hereinabove. It is preferred that this method further include providing the four elongate panel members as a rigid polymeric plastic foam panels. It is also preferred that the providing of the four elongate panel members provides that the lengths of the four elongate panel members be sufficient to extend past a second lengthwise edge of an adjacent panel member, and that the method further includes cutting off any length of any the elongate panel members that extends past that second lengthwise edge.

Another aspect of the invention is a preferred cutting device to cross cut through an elongate rigid polymeric plastic foam panel member having lengthwise parallel edges and a cross section with a thickness and a width between the lengthwise parallel edges. The cutting device includes a base platform and a horizontal support floor surface supported on the base platform, the surface being of sufficient size and shape to support a length of elongate rigid polymeric plastic foam panel member resting on a lengthwise edge. The cutting device further includes a vertical wall that includes a vertical surface abutting the horizontal support floor surface. The vertical surface includes a height extending upwardly from the floor surface to an upper edge above the floor surface a distance greater than the width of the plastic foam panel. The cutting device also includes a vertical slot through the vertical wall extending downwardly from a height to the floor surface a distance greater than the width of the plastic foam panels, wherein the vertical slot extends downwardly through the floor surface. The cutting device further includes guide means supported on the base platform to support a slide member proximate the vertical slot and guide the slide member in a vertical movement vector. The cutting device also includes knife means to cut a foam panel attached to the slide member. The knife means includes a knife cutting edge extending from a position proximate the slide member through the vertical slot of the vertical wall and above the floor surface. The knife edge is angled horizontally at a forty-five degree angle to the front surface of the vertical wall. The cutting device further includes lever means to alternatively move the slide member upwardly to position the knife cutting edge above a foam panel resting on the floor surface and then to force the slide member downwardly to cause the knife cutting edge to cut the panel member.

It is preferred that the vertical slot be angled horizontally at a forty-five degree angle tó the front surface of the vertical wall. It is further preferred that the knife cutting edge be angled upwardly toward the front vertical surface. It is further preferred that the slide member include an inverted "U" shaped member having two vertically disposed sections, two bracket extensions each extending horizontally from each of the vertically disposed sections, and vertical openings through each bracket extension, and that the guide means include two vertical rod members slide fitting through the vertical openings in the bracket extensions.

Yet another aspect of the invention is an alternative cutting device to cross cut through elongate rigid polymeric plastic foam panels having lengthwise parallel edges and a cross section with a thickness and a width between the lengthwise parallel edges. The cutting device includes a horizontal support floor surface and a vertical wall that includes a vertical front surface abutting the horizontal support floor surface, the front surface being of a height extending upwardly from the floor surface to an elevation above the floor surface greater than the width of the plastic foam panels, and a rear surface. The cutting device further includes a vertical slot through the vertical wall extending downwardly from a height higher than the width of the plastic foam panel resting on the floor surface into and below the floor surface. The cutting device may include holding means to hold a length of the plastic foam panels resting one of the lengthwise parallel edges on the horizontal support floor surface and against the front vertical wall surface, the holding means includes a member with a vertical surface disposed to be forced against the foam panel. The cutting device further includes a slide member adjacent the rear surface of the vertical wall and guide means to support the slide member and guide the slide member in a vertical movement vector. The cutting device further includes knife means to cut the foam panels attached to the slide member and includes a knife cutting edge extending from the slide member through the vertical slot of the vertical wall, the knife edge being angled at a forty five degree angle to the front surface of the vertical wall. The cutting device further includes lever means to alternatively move the slide member upwardly to position the knife cutting edge above the plastic foam panel member and force the slide member downwardly to cause the knife cutting edge to cut the panel member.

DESCRIPTION OF PREFERRED EMBODIMENTS

Figure 1:
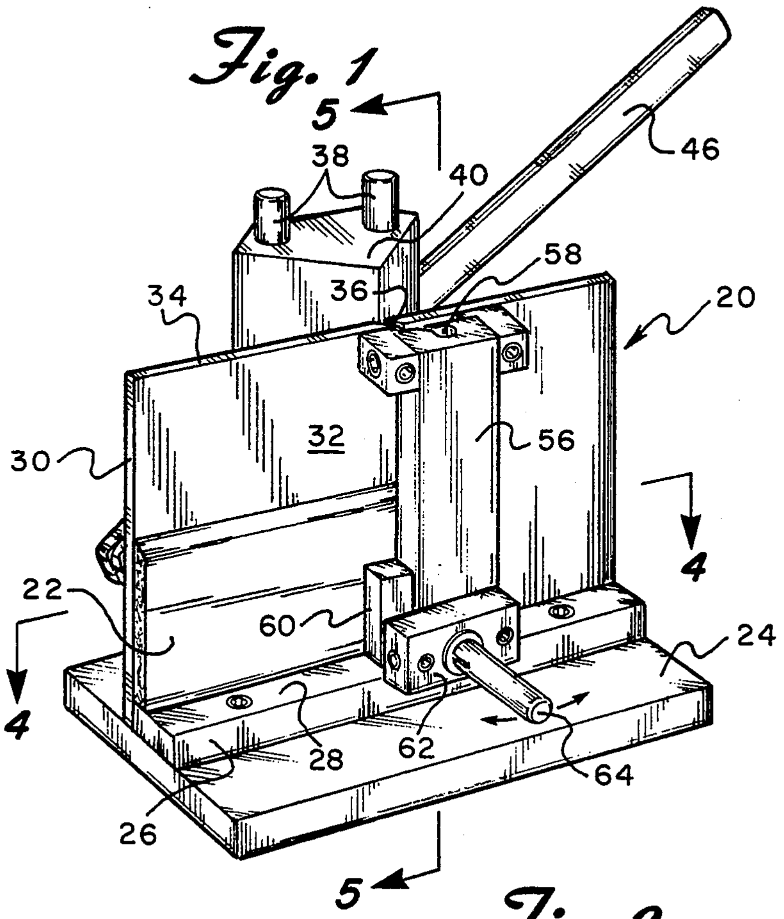
FIG. 1 is a front perspective view of a cutting device of the present invention.
Figure 3:
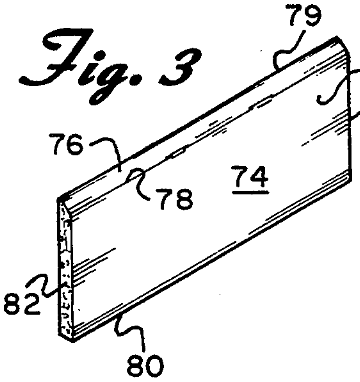
FIG. 3 is a perspective view of a bevel board used in the invention.
Figure 2:
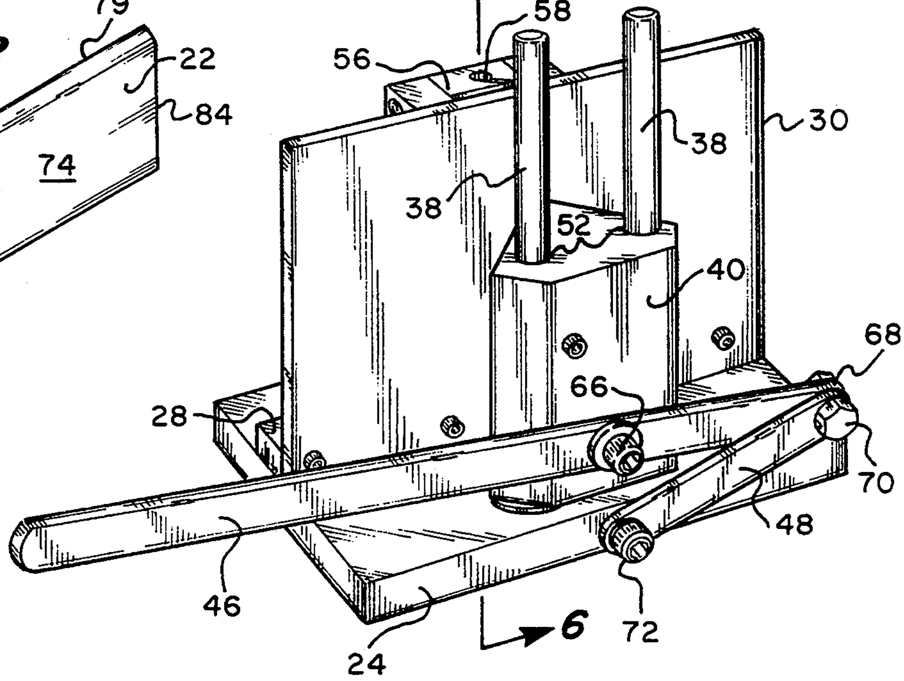
FIG. 2 is a rear perspective view thereof.
Figure 5:
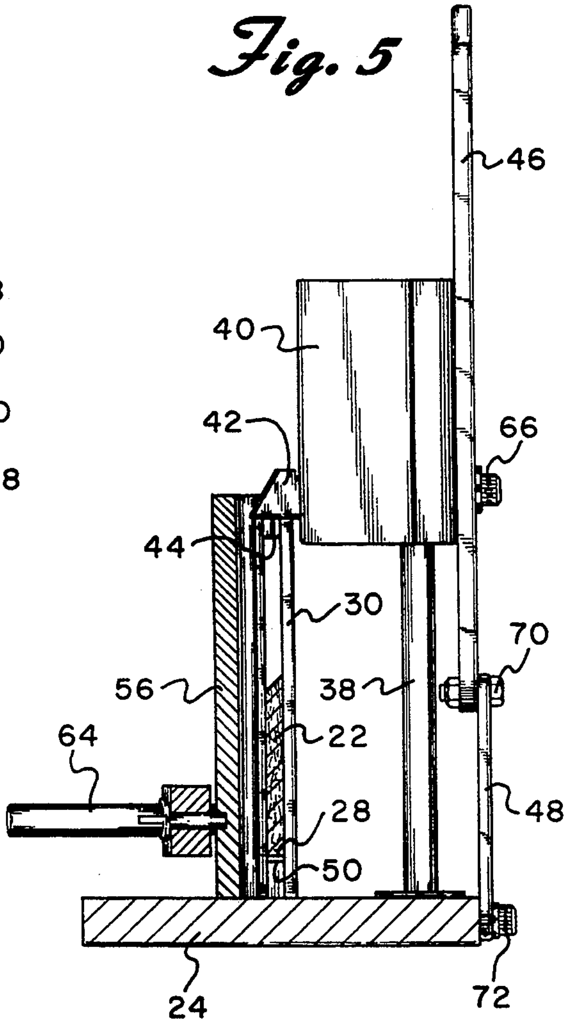
FIG. 5 is a cross-sectional view taken along lines 5—5 of FIG. 1.
Figure 4:
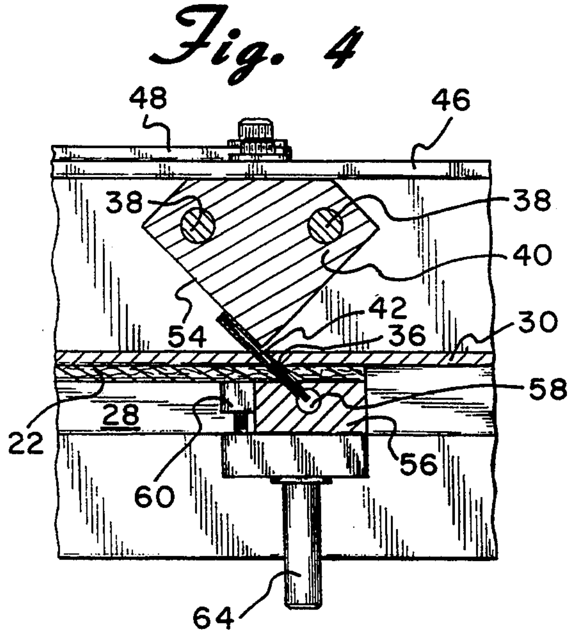
FIG. 4 is a cross-sectional view taken along lines 4—4 of FIG. 1.
Figure 6:
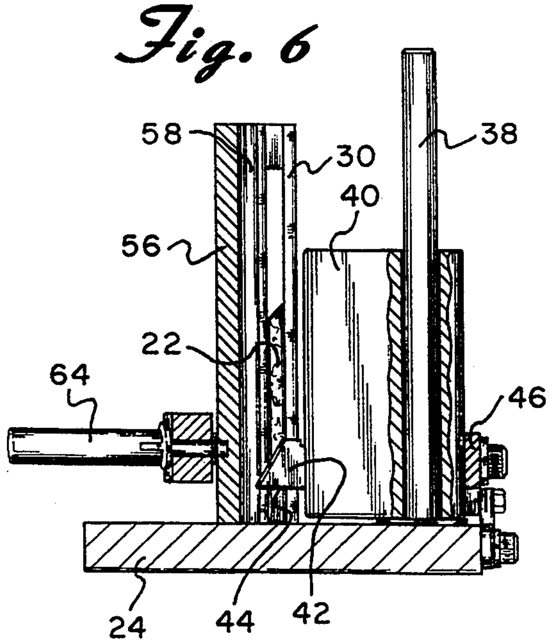
FIG. 6 is a cross-sectional view similar to that of FIG. 5 with the cutting operation having taken place.

Device 20 is pictured in FIGS. 1, 2, 4, 5, and 6 to cut bevel board panel member 22 while it rests on a lengthwise edge in the device. Device 20 is constructed of irradiated aluminum although it may be constructed of steel, coated aluminum or plastic in whole or part. Device 20 includes base platform 24 onto which support member 26 is bolted providing upper horizontal support surface 28 on which the flat lengthwise edge of bevel board member 22 rests during the cutting process. Bevel board is held tightly against front vertical surface 32 of vertical wall 30 either with hand pressure or with a mechanical holding device described below. Front surface 32 includes upper edge 34 which is at a height well above the upper lengthwise side edge of panel member 22. Vertical slot 36 is cut the entire height of wall 34, although that is not necessary so long as the slot is of sufficient height to allow the cutting blade to be lifted and held well above the panel member. Vertical slot 36 also extends downwardly below support surface 28 to end 50 as shown in FIG. 5. Knife blade 42 extends through vertical slot 36 from the rear through front surface 32 a sufficient distance to engage the entire thickness of bevel board 22 in its cutting motion. The cutting movement is accomplished by a slide member holding blade 42 riding vertically on a guide mechanism actuated by a lever to allow sufficient force to be applied in the cutting movement. Circular vertical rods 38 are supported from and extend upwardly from base platform 24 to the rear of vertical wall 30. Slide member 40 includes vertical holes 52 allowing member 40 to slide freely upwardly and downwardly on rods 38. Vertical surface 54 is provided on slide member 40 angled at a forty-five degree angle to front surface 32 and parallel to vertical slot 36. Knife blade 42 is attached against that surface with suitable threaded members holding the blade in position. Knife blade 42 includes lower knife cutting edge 44 which in this embodiment is horizontal, but as shown below is preferably angled downwardly from the blade holder. In this embodiment, knife guide member 56 is supported vertically above surface 28 leaving space between it and front surface 32 sufficient for bevel board member 22 to slide between the guide and the front surface. Vertical slot 58 is provided in knife guide 56 essentially as an extension and in alignment with vertical slot 36. Knife blade 42 freely slides, but is supported from undue horizontal movement by slots 36 and 58. Panel member 22 is held against surface 32 by holding block 60 which is urged by member 62 using lever handle 64 to move block 60 and lock it in place against bevel board member 22. Slide member 40 is lifted upwardly by pulling up on lever handle 46 attached at a median position with pivot bolt attachment 66 to member 40. End 68 of handle 46 is pivotally attached through bolt attachment 70 to one end of lever member 48. The other end of lever member 48 is attached though pivot bolt attachment 72 to platform 24. The cutting process is accomplished by applying force downwardly on handle 46 to achieve a relatively easy cut. In FIG. 1, handle 46 has been lifted to raise slide member 40 prior to the cutting operation of bevel board panel member 22. In FIG. 2, handle member 46 has been forced downwardly essentially completing the cutting operation bringing slide member 40 to its downward position. In FIG. 3, prior to the cutting operation, bevel board panel 22 is as supplied.

Figure 7:
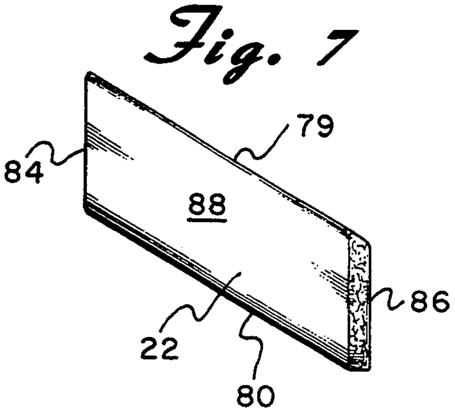
FIG. 7 is a perspective view of a bevel board cut using said device.

The bevel board includes front surface 74 which terminates at a lengthwise edge of flat surface 80 and first lengthwise edge 78 from which lengthwise beveled surface 76 extends away from and facing front surface 74 at a forty-five degree angle. Actually, as shown in the drawing, the corners are slightly rounded in that some versions of the bevel board are covered with neutral pH paper which has a tendency to slightly round off the corners. Before cutting, both ends 82 and 84 are at a ninety degree angle to front surface 74. As shown in FIG. 7, elongate panel member 22 has been cut using device 20 or device 122 described hereinbelow to form beveled end surface 86 which angles away from and facing away from front surface 74 and toward the body of the panel. When looking at rear surface 88 of the bevel board panel, beveled surface 86 is visible. The lengthwise beveled surface 76 terminates at pointed corner edge 79 which is the upper limit of rear surface 88.

Figure 8:
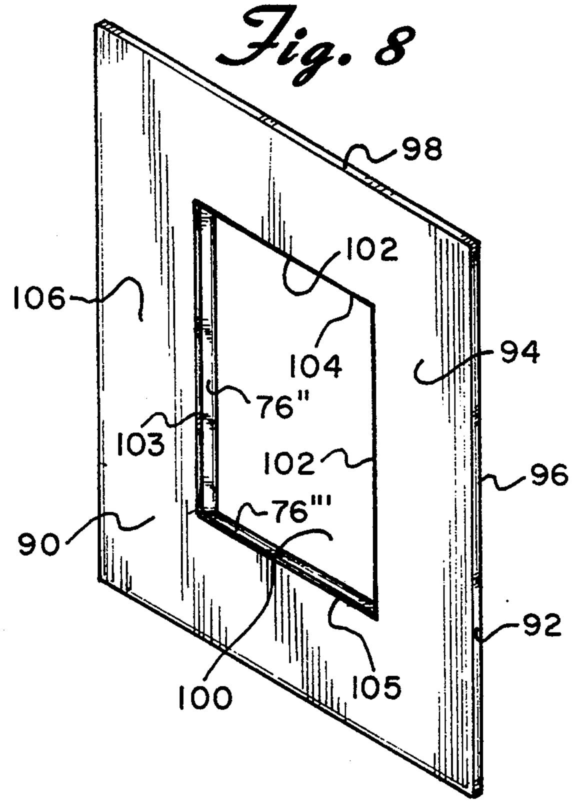
FIG. 8 is a front perspective view of a mat to which bevel board panels as cut in FIG. 7 are attached to the rear surface of the mat.
Figure 9:
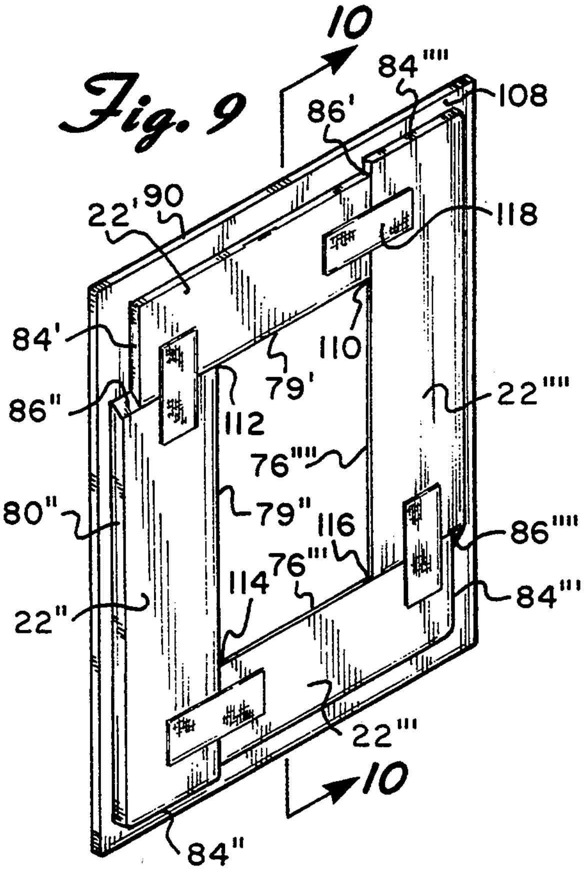
FIG. 9 is a rear perspective view thereof showing the bevel board positioned and attached to the rear of the mat.
Figure 10:
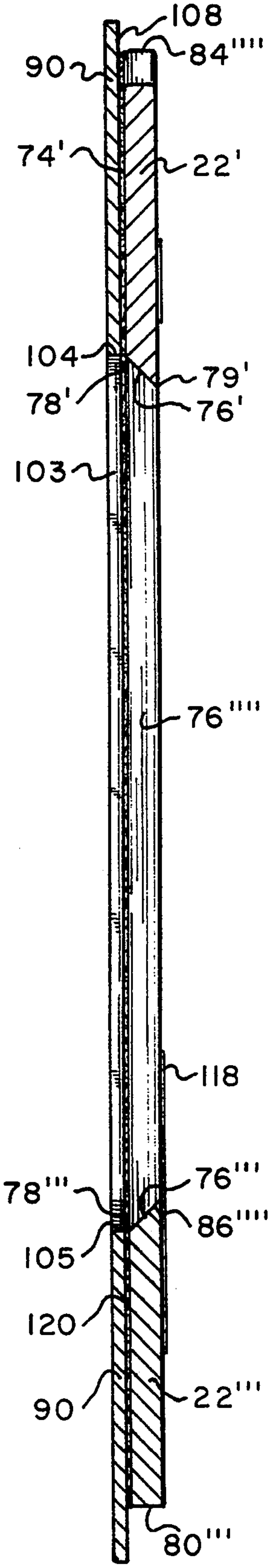
FIG. 10 is a cross-sectional view taken along lines 10—10 of FIG. 9.

In FIGS. 8 through 10, a method of using four bevel board panel members 22, as shown cut in FIG. 7, is illustrated. Standard mat 90 is an integral unit cut from heavy paper board and is supplied in a variety of colors, textures and surfaces. Met 90 is bounded by outer rectangular peripheral edge 92 with length 96 and width 98. Mat 90 has front surface 94 which is visible 25 surrounding a picture positioned in rectangular opening 100 which is bounded by inner peripheral edge 102. Opening 100 has right length 102, left length 103, upper width 104, and lower width 105. In most all mats width 106, which is the distance horizontal or vertical, between the inner peripheral edge and the outer peripheral edge, is constant on all sides. In the view of FIG. 8, the matting and the depth matting are as normally seen showing lengthwise beveled surfaces 76 around the entire inner peripheral edge 102. In this perspective view, beveled surfaces 76″ and 76‴ are seen while beveled surfaces 76′ and 76″″ are hidden in this view, but are quite visible from other angles when the framing system is utilized. The prime designations refer to the four beveled panel members identified with one to four prime designations. As shown in FIG. 9, the rear surface 108 of mat 90 is shown. This would all be hidden from the view of the picture with only the lengthwise beveled surfaces being exposed when viewed from the front. At the corners, the inner section of the two beveled surfaces provides a line of demarcation that makes it look like it is a mitered cut and is quite pleasing to the eye. In the process, four panel members 22′, 22″, 22‴ and 22″″ are cut. As will be seen, the actual length of bevel board panel members 22 is not overly critical so long as there is a sufficient overlap to receive the beveled end surfaces 86. For example, it is not critical whether flat end 84′ extends past lengthwise edge 80″″ or is slightly shorter as shown in the diagram. All that is critical is that there be a sufficient overlap of surfaces or that the panel members are not so long that they extend past the outside peripheral edge of mat 90. Thus, it is necessary that the length be longer than the width of length of the inner peripheral edge, width or length, as the case may be, 104/105 or 102/103 respectively and shorter than the sum of either the width or length and width 106 across the mat frame member. The method begins by abutting front surface 74 of panel member 22′ against rear surface 108 of mat 90 while aligning first lengthwise edge 78 along upper width edge 104 with end 86′ positioned at first corner 110 and with second end 84′ extending past second corner 112. Double sided adhesive tape is used to adhere surface 74 to surface 108. Bevel board panel member 22″ is then attached by abutting and adhering its front surface to rear surface 108 while aligning the first lengthwise edge 78 along inner peripheral edge 103 with beveled face 86″ abutting lengthwise beveled surface 76′. Next, bevel board panel member 22‴ is abutted and adhered in the same fashion with beveled surface 86‴ (hidden) abutting a portion of lengthwise beveled face 76″ of board 22 while its first lengthwise edge is aligned with the opening edge 105 of mat 90. Finally, bevel board panel member 22″″ is abutted and adhered to mat 90 in the same fashion abutting beveled end surface 86″″ against a portion of beveled surface 76‴ while aligning first lengthwise edge 78 with edge 103 of mat 90. Tape 118 is used to reinforce the joints between the beveled panel members. FIG. 10, shows how first lengthwise edge 78′ of panel member 22′ is aligned with edge 104 of mat 90. Likewise, lengthwise edge 78‴ is aligned with edge 105 of the mat. Further, beveled end surface 86″″ is abutted against a section of beveled face 76‴. Also in this view, double sided adhesive tape 120 is shown attaching the front 25 faces of members 22 with rear surface 108 of mat 90.

Figure 11:
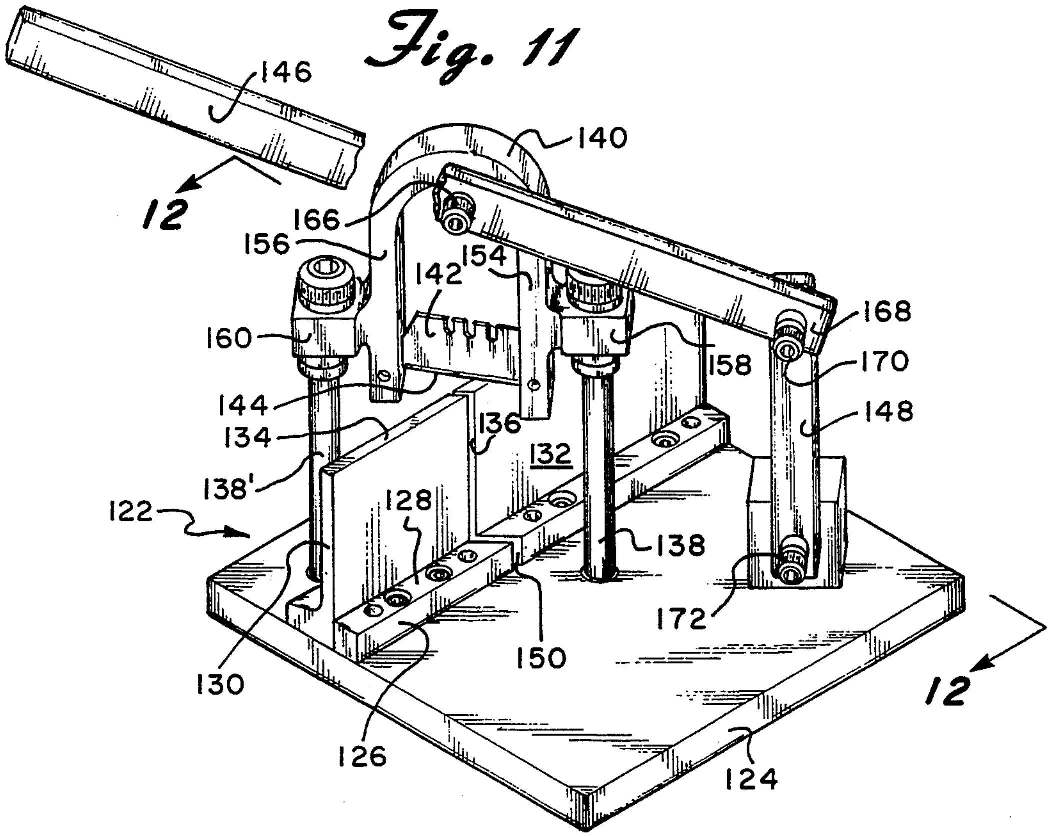
FIG. 11 is a top, rear, right side perspective view of a second embodiment of the cutting device of the present invention.
Figure 12:
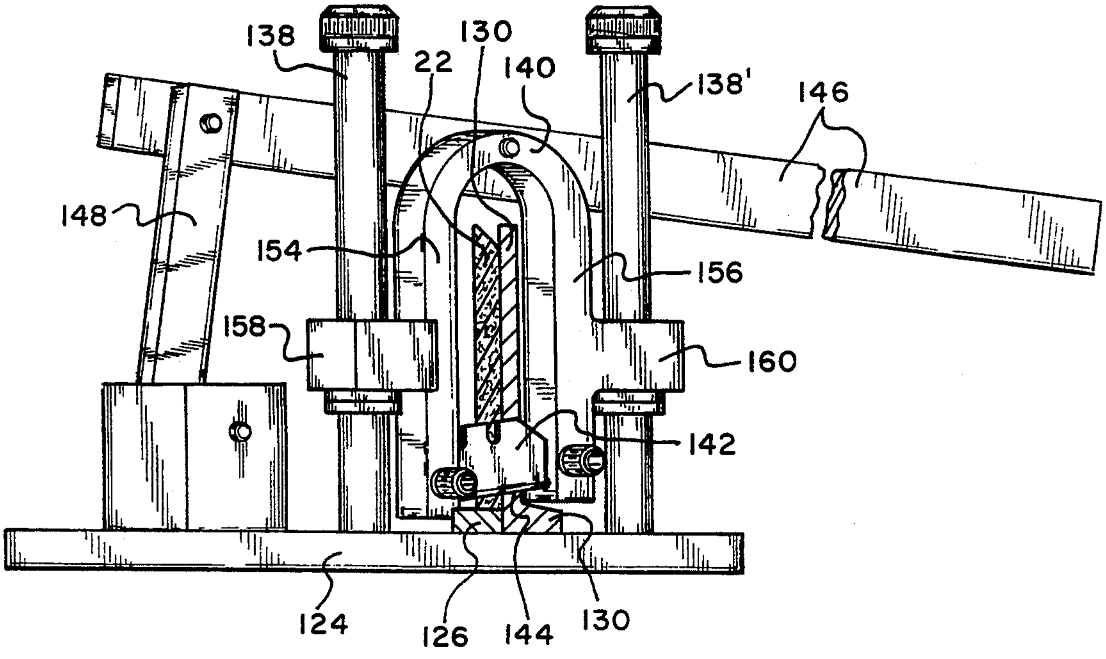
FIG. 12 is a right side plane diagram thereof with a bevel board panel in place after cutting with a section of the vertical wall and horizontal support cut away.

In FIGS. 11 and 12, a second preferred embodiment bevel board cutting apparatus 122 is shown; the last figure being a diagram to show the bevel board being cut. Elements 124 through 148 and 166 through 172 correspond to similar elements of the first embodiment with the one hundred digit added. Thus, 124 is the base platform of device 122 corresponding with base platform 24 of device 22. The same system continues for the other number designations in the ranges noted. However, the directions front and rear are reversed between devices 20 and 122. In device 122 vertical surface 132 of wall 130 is a rear surface, but it is again the surface against which the panel of bevel board is held to be cut. Slide member 140 is shaped as an inverted "U" member with vertical sections 154 and 156 depending downwardly. Handle member 146 is attached through pivot bolt mechanism 166 to the upper base section of the inverted "U" shape. Blade 142 is supported at both ends, one end releasably attached to section 154 and the other to section 156 of slide member 140. Slide member 140 is positioned such that it moves upwardly and downwardly with section 154 on the front of front face 132 and section 156 moving upwardly and downwardly behind wall 130. This is accomplished by positioning vertical rod 138 in front of wall 130 and vertical rod 138′ behind wall 130. Further, as is illustrated in the diagram of FIG. 12, slide member 140 is angled at a forty-five degree angle so as to easily position blade 142 to ride up and downwardly in slot 136 which terminates below surface 128 at end 150 in support member 126. Vertical holes which allow slide member 140 to slide upwardly and downwardly on rods 138 and 138′ are cut through front extension 158 and rear extension 160 which extend from and are an integral part of vertical sections 154 and 156 respectively. As also illustrated in the diagram of FIG. 12, with vertical wall 130 and bevel board panel member 22 cut away, blade 142 is angled such that cutting edge 144 is angled downwardly toward the front. This angle, tends to force bevel board 22 against surface 132 of wall 130 and further facilitates and makes the cut proceed more easily through the rigid foam material. While an angle of edge 144 of about ten degrees is sufficient, it is preferred to be in the range of about fifteen to about thirty degrees. In this embodiment bevel board 22 is placed in device 122 with front surface 74 against surface 132 with bottom edges 80 resting on surface 128. This places pointed corner 79 off of surface 128. Board 22 is held with the left hand positioned to the left side of the device holding board 80 against surface 132. While this necessitates the person not being able to see the board during the cutting process, that poses no problem. The length of the panel 22 after the cut is not critical and may be plus or minus a half inch or more without any effect in use in the method invention described hereinabove. A safety wall extending horizontally about one-half inch from the front face of wall 130 extending the height of the wall prevents inadvertently placing the holding left hand too close to the blade from the left side of slot 136. In using device 122, the piece to be used in the method is held with the left hand with the other end dropping off. The bevel board length just cut off is then fed in and a second length is cut, the cut again forming the operative beveled end face. Since the opposite end is not critical as to length or type of edge, it may remain a forty-five degree angled face.

While this invention has been described with reference to the specific embodiments disclosed herein, it is not confined to the details set forth and the patent is intended to include modifications and changes which may come within and extend from the following claims.

I claim:

1. A method of making a mat to frame a picture having a front surface, a rear surface, and a peripheral outer edge, the method comprising:

(a) providing a depth matting elongate panel, each panel comprising:
   (i) a thickness,
   (ii) a front surface having a lengthwise edges and a width, and
   (iii) a lengthwise beveled edge surface angled from a first lengthwise edge of the front surface at a forty-five degree angle downwardly from and facing the front surface,
(b) cutting a beveled face on an end of the depth matting elongate panel normal to the length of the panel member and at a forty-five degree angle from and facing away from the front surface,
(c) cutting four elongate panel members from the elongate panel, the cutting resulting in each panel member comprising:
   (i) a length of the front surface terminating at first and second ends, and
   (ii) a beveled face on each first end of each panel member normal to the length of the panel member and at a forty-five degree angle from and facing away from the front surface,
(d) aligning all four panel members flat on a surface with the front surfaces facing a same direction,
(e) abutting the beveled face of the first end of a first panel member against the lengthwise beveled edge of a second panel member proximate the second end of the second panel member,
(f) adhering the first panel member to the second panel member,
(g) abutting the beveled face of the first end of the second panel member against the lengthwise beveled edge of a third panel member proximate the second end of the third panel member,
(h) adhering the second panel member to the third panel member,
(i) abutting the beveled face of the first end of the third panel member against the lengthwise beveled edge of a forth panel member proximate the second end of the forth panel member,
(j) adhering the third panel member to the forth panel member,
(k) abutting the beveled face of the first end of the fourth panel member against the lengthwise beveled edge of the first panel member proximate the second end of the first panel member, and
(l) adhering the forth panel member to the first panel member.

2. The method of claim 1 further comprising:

(a) providing a rectangular integral mat frame member having a front surface, a rear surface, a peripheral outer edge with a width and a length, a rectangular opening having four inner peripheral edges, and a width across the frame member from inner edge to outer edge, wherein the width of the panel members is less than the width across the rectangular integral mat frame member from inner edge to outer edge, and (b) attaching the front surfaces of the attached panel members to the rear surface of the integral mat frame member exposing fully and only the lengthwise beveled edges the panel members when the front surface of the integral mat frame member is viewed.

3. The method of claim 1 further comprising providing the depth matting elongate panel as a rigid polymeric plastic foam panel.

4. The method of claim 1 wherein the cutting of the elongate panel yields the lengths of the four elongate panel members being sufficient to extend past a second lengthwise edge of an adjacent panel member, and the method further includes cutting off any length of the elongate panel member that extends past that second lengthwise edge.

5. A method of making a kit to make a mat to frame a picture having a front surface, a rear surface, and a peripheral outer edge, the method comprising:

(a) providing a depth matting elongate panel, each panel comprising:
   (i) a thickness,
   (ii) a front surface having lengthwise edges and a width, and
   (iii) a lengthwise beveled edge surface angled from a first lengthwise edge of the front surface at a forty-five degree angle downwardly and facing the front surface, wherein the lengthwise beveled edge surface has a length greater than the peripheral outer edge of the picture,
(b) cutting a beveled face on an end of the depth matting elongate panel normal to the length of the panel member and at a forty-five degree angle from and facing away from the front surface, and
(c) cutting four elongate panel members from the elongate panel, the cutting resulting in each panel member comprising:
   (i) a length of the front surface terminating at first and second ends, and
   (ii) a beveled face on each first end of each panel member normal to the length of the panel member and at a forty-five degree angle from and facing away from the front surface.

6. The method of claim 5 further comprising providing the depth matting elongate panel as a rigid polymeric plastic foam panel.

7. The method of claim 5 further comprising providing a rectangular integral mat frame member having a front surface, a rear surface, a peripheral outer edge with a width and a length, a rectangular opening having four inner peripheral edges, and a width across the frame member from inner peripheral edge to outer peripheral edge, wherein the width of the panel members is less than the width across the frame member from inner edge to outer edge, and wherein the length of the front surface of two of the elongate panel members is greater than the width of the opening and less than the sum of the width of the opening and the width across the frame member from inner peripheral edge to outer peripheral edge, and the length of the front surface of the remaining two of the elongate panel members is greater than the length of the opening and less than the sum of the length of the opening and the width across the frame member from inner peripheral edge to outer peripheral edge.

8. A method of framing a picture surrounded by a rectangular integral mat frame member having a front surface, a rear surface, a peripheral outer edge with a width and a length, a rectangular opening having four inner peripheral edges with a width and a length, and a width across the frame member from inner peripheral edge to outer peripheral edge, the method of installing depth matting sandwiched between the picture and the rear surface of the mat frame member comprising:

(a) providing an elongate depth matting panel, each panel comprising:
  (i) a thickness sufficient to provide a chosen depth between the picture and the mat frame member,
  (ii) a front surface having lengthwise edges and a width less than the width across the mat frame member, and
  (iii) a lengthwise beveled edge surface angled from a first lengthwise edge of the front surface at a forty-five degree angle downwardly from and facing the front surface, (b) cutting a beveled face on an end of the depth matting elongate panel normal to the length of the panel member and at a forty-five degree angle from and facing away from the front surface, (c) cutting four elongate panel members from the elongate panel, the cutting resulting in each panel member comprising:
  (i) a length of the front surface terminating at first and second ends, and
  (ii) a beveled face on each first end of each panel member normal to the length of the panel member and at a forty-five degree angle from and facing away from the front surface, wherein the length of the front surface of two of the elongate panel members is greater than the width of the opening and less than the sum of the width of the opening and the width across the frame member from inner peripheral edge to outer peripheral edge, and the length of the front surface of the remaining two of the elongate panel members is greater than the length of the opening and less than the sum of the length of the opening and the width across the frame member from inner peripheral edge to outer peripheral edge, (d) abutting and adhering the front surface of a first elongate panel member against the rear surface of the mat frame member while aligning the first lengthwise edge of said elongate panel member along a first inner peripheral edge of the opening of the mat frame member with the first end of said elongate panel member positioned at a first corner of said opening and the second end positioned past a second corner of said opening abutting a section of said rear surface, (e) abutting and adhering the front surface of a second elongate panel member against the rear surface of the mat frame member while aligning the first lengthwise edge of said elongate panel member along a second inner peripheral edge of the opening of the mat frame member extending from the second corner to a third corner of said opening, with the first end of said elongate panel member positioned at the second corner of said opening, the beveled face on said first end abutting the lengthwise beveled edge of the first elongate panel member, and the second end of the second elongate panel member positioned past the third corner of said opening abutting a section of said rear surface, (f) abutting and adhering the front surface of a third elongate panel member against the rear surface of the mat frame member while aligning the first lengthwise edge of said elongate panel member along a third inner peripheral edge of the opening of the mat frame member extending from the third corner to a forth corner of said opening, with the first end of said elongate panel member positioned at the third corner of said opening, the beveled face on said first end abutting the lengthwise beveled edge of the second elongate panel member, and the second end of the third elongate panel member positioned past the forth corner of said opening abutting a section of said rear surface, and (g) abutting and adhering the front surface of a forth elongate panel member against the rear surface of the mat frame member while aligning the first lengthwise edge of said elongate panel member along a forth inner peripheral edge of the opening of the mat frame member extending from the forth corner to the first corner of said opening, with the first end of said elongate panel member positioned at the forth corner of said opening, the beveled face on said first end abutting the lengthwise beveled edge of the third elongate panel member, and the second end of the forth elongate panel member positioned past the first corner of said opening abutting a section of said rear surface, wherein the beveled face on the first end of the first elongate panel member abuts the lengthwise beveled edge of the forth elongate panel member.

9. The method of claim 8 further comprising adhering each elongate panel member to an adjacent elongate panel member.

10. The method of claim 9 wherein the adhering of each elongate panel member to an adjacent elongate panel member done with adhesive tape as each elongate panel member is in turn adhered to the mat frame member.

11. The method of claim 8 further comprising providing the depth matting elongate panel as a rigid polymeric plastic foam panel.

12. A method of making a mat to frame a picture having a front surface, a rear surface, and a peripheral outer edge, the method comprising:

(a) providing four elongate panel members, each panel member comprising:
  (i) a thickness, (ii) a front surface having a lengthwise edges and a width, (iii) a lengthwise beveled edge surface angled from a first lengthwise edge of the front surface at a forty-five degree angle downwardly from and facing the front surface, (iv) a length of the front surface terminating at first and second ends, and (v) a beveled face on each first end of each panel member normal to the length of the panel member and at a forty-five degree angle from and facing away from the front surface, (b) aligning all four panel members flat on a surface with the front surfaces facing a same direction, (c) abutting the beveled face of the first end of a first panel member against the lengthwise beveled edge of a second panel member proximate the second end of the second panel member, (d) adhering the first panel member to the second panel member, (e) abutting the beveled face of the first end of the second panel member against the lengthwise beveled edge of a third panel member proximate the second end of the third panel member, (f) adhering the second panel member to the third panel member, (g) abutting the beveled face of the first end of the third panel member against the lengthwise beveled edge of a forth panel member proximate the second end of the forth panel member, (h) adhering the third panel member to the forth panel member, (i) abutting the beveled face of the first end of the fourth panel member against the lengthwise beveled edge of the first panel member proximate the second end of the first panel member, and (j) adhering the forth panel member to the first panel member.

13. The method of claim 12 further comprising:

(a) providing a rectangular integral mat frame member having a front surface, a rear surface, a peripheral outer edge with a width and a length, a rectangular opening having four inner peripheral edges, and a width across the frame member from inner edge to outer edge, wherein the width of the panel members is less than the width across the rectangular integral mat frame member from inner edge to outer edge, and (b) attaching the front surfaces of the attached panel members to the rear surface of the integral mat frame member exposing fully and only the lengthwise beveled edges the panel members when the front surface of the integral mat frame member is viewed.

14. The method of claim 12 further comprising providing the four elongate panel members as a rigid polymeric plastic foam panels.

15. The method of claim 12 wherein the providing of the four elongate panel members provides that the lengths of the four elongate panel members be sufficient to extend past a second lengthwise edge of an adjacent panel member, and the method further includes cutting off any length of any the elongate panel members that extend past that second lengthwise edge.

* * * * *